United States Patent [19]
Shieh et al.

[11] Patent Number: 6,133,329
[45] Date of Patent: Oct. 17, 2000

[54] AROMATIC POLYESTER POLYOLS MADE FROM A NATURAL OIL

[75] Inventors: David J. Shieh, Sugar Land; Alberto DeLeon, Kingwood, both of Tex.

[73] Assignee: Oxid L.P., Houston, Tex.

[21] Appl. No.: 09/282,591

[22] Filed: Mar. 31, 1999

[51] Int. Cl.[7] ................................ C08J 11/04; C08J 9/14
[52] U.S. Cl. ...................... 521/48.5; 521/48; 521/131; 521/172; 521/173; 525/437; 528/272; 528/495; 528/496
[58] Field of Search ...................... 528/272, 495, 528/496; 521/48, 48.5, 172, 173, 131; 525/437

[56] References Cited

U.S. PATENT DOCUMENTS

| | | | |
|---|---|---|---|
| 4,644,048 | 2/1987 | Magnus et al. | 528/176 |
| 4,720,571 | 1/1988 | Trowell | 560/91 |
| 4,722,803 | 2/1988 | Magnus et al. | 252/182 |
| 4,758,602 | 7/1988 | Trowell | 521/109.1 |
| 4,897,429 | 1/1990 | Trowell et al. | 521/157 |
| 5,360,900 | 11/1994 | DeLeon et al. | 536/18.3 |
| 5,407,967 | 4/1995 | Williams et al. | 521/130 |
| 5,464,561 | 11/1995 | Williams et al. | 252/182.27 |
| 5,496,869 | 3/1996 | Williams et al. | 521/172 |
| 5,847,018 | 12/1998 | Blanpied et al. | 521/107 |
| 5,854,358 | 12/1998 | Heinemann et al. | 525/404 |
| 5,859,078 | 1/1999 | Chittolini | 521/109.1 |
| 5,922,779 | 7/1999 | Hickey | 521/114 |

*Primary Examiner*—Morton Foelak
*Attorney, Agent, or Firm*—Tim Headley; Haynes and Boone, LLP

[57] ABSTRACT

Methods of making aromatic polyester polyols that are suitable for use with hydrocarbon and hydrofluorocarbon blowing agents. The polyols are made by reacting polyethylene terephthalate, dissolved in a solution comprising a plurality of glycols, with a natural oil. The natural oil reacts into the polyol backbone at a specific temperature. Aromatic polyester polyols that are suitable for use with hydrocarbon and hydrofluorocarbon blowing agents. The polyols are made from polyethylene terephthalate and a natural oil. The polyols exhibit low hydroxyl numbers and low viscosities, and hydrocarbons and hydrofluorocarbons blowing agents are soluble in these polyols. A method for making foam using the polyols of the present invention. The method includes reacting a polyol of the present invention, mixed with other polyol components, with an isocyanate component.

30 Claims, No Drawings

AROMATIC POLYESTER POLYOLS MADE FROM A NATURAL OIL

TECHNICAL FIELD

This invention relates to the field of aromatic polyester polyols, and, more particularly, to aromatic polyester polyols made from recycled polyethylene terephthalate and a natural oil.

BACKGROUND OF THE INVENTION

Foam producers use aromatic polyester polyols in the production of polyurethane and polyisocyanurate foams. Currently, foam producers use hydrochlorofluorocarbons as blowing agents to produce polyurethane and polyisocyanurate foams. However, the use of hydrochlorofluorocarbons as blowing agents presents ecological problems. Therefore, in the future, foam producers will phase out the use of hydrochlorofluorocarbons.

Researchers have tried to develop alternate blowing agents to replace hydrochlorofluorocarbons. As a result of this research, pentanes and hydrofluorocarbons have emerged as suitable replacements for hydrochlorofluorocarbons. However, these hydrocarbons and hydrofluorocarbons have poor solubility in currently available polyols.

Accordingly, what is needed are aromatic polyester polyols that are suitable for use with hydrocarbon and hydrofluorocarbon blowing agents.

SUMMARY OF THE INVENTION

The present invention, accordingly, provides methods for making aromatic polyester polyols that are suitable for use with hydrocarbon and hydrofluorocarbon blowing agents. The polyols are made by reacting polyethylene terephthalate, dissolved in a solution comprising a plurality of glycols, with a natural oil. The natural oil reacts into the polyol backbone at a specific temperature.

The present invention also provides for aromatic polyester polyols that are suitable for use with hydrocarbon and hydrofluorocarbon blowing agents. The polyols are made from polyethylene terephthalate and a natural oil. These polyols exhibit low hydroxyl numbers and low viscosities, and hydrocarbon and hydrofluorocarbon blowing agents are soluble in these polyols.

The present invention further provides for a method of making foam using the polyols of the present invention. The method includes reacting a polyol of the present invention, mixed with other polyol components, with an isocyanate component.

DETAILED DESCRIPTION OF THE PREFERRED EMBODIMENT

The polyester polyols of the present invention are made from polyethylene terephthalate and a natural oil. An operator of a chemical manufacturing plant can make the polyols by one of two methods, according to the present invention. The first method involves dissolving recycled polyethylene terephthalate in a mixture of glycols, which may include, but is not limited to, diethylene glycol, triethylene glycol, tetraethylene glycol, and/or pentaethylene glycol, or combinations thereof. The operator heats the polyethylene terephthalate-glycol mixture in a 10 liter glass pot for about 3 hours, at about 450° F., with constant agitation. The operator then cools the mixture to about 300° F. After cooling the mixture, the operator then filters the mixture to remove any undigested material, mixes the filtrate with a polyfunctional alcohol and a natural oil, and then heats the filtratepolyfunctional alcohol-oil mixture in a 10 liter glass pot, at about 450° F., under a 100 mm Hg vacuum. The natural oil can be any natural oil, including corn oil or sunflower oil. In preferred embodiments, the polyfunctional alcohol comprises pentaerythritol. At about 400° F., the operator can add a catalyst to the mixture. The catalyst may comprise a triethanolamine titanate chelate. The distillation process continues until the operator has collected the theoretical amount of ethylene glycol, namely the amount of ethylene glycol produced upon completion of the reaction. The operator then isolates the resulting polyester polyol.

The second method involves dissolving recycled polyethylene terephthalate in a mixture of glycols, which may include, but is not limited to, diethylene glycol, triethylene glycol, tetraethylene glycol, and/or pentaethylene glycol, or combinations thereof. The operator heats the polyethylene terephthalate-glycol mixture in a 10 liter glass pot, for about 3 hours, at about 450° F., with constant agitation, and cools the mixture to about 300° F. After cooling the mixture, the operator then filters the mixture to remove any undigested material, mixes the filtrate with a polyfunctional alcohol, phthalic anhydride, and a natural oil, and heats the filtratepolyfunctional alcoholphthalic anhydride-oil mixture in a 10 liter glass pot, at about 450° F., under a 200 mm Hg vacuum. The natural oil can be any natural oil, including corn oil or sunflower oil. In preferred embodiments, the polyfunctional alcohol comprises pentaerythritol. At about 420° F., the operator can add a catalyst to the mixture. The catalyst may comprise a triethanolamine titanate chelate. The distillation process continues until the operator has collected the theoretical amount of water, namely the amount of water produced upon completion of the reaction. The operator then isolates the resulting polyester polyol.

The recycled polyethylene terephthalate used in the present invention may come from a variety of sources, including, but not limited to, plastic soft drink bottles, photographic film, X-ray film, and TV dinner trays. The recycled polyethylene terephthalate material, from whatever source, must be adequately cleaned before use in the present invention. The preferred method is to use recycled polyethylene terephthalate to reduce costs. However, polyethylene terephthalate from any source may be used in the present invention.

The natural oil used in the methods of the present invention may comprise any number of natural oils, or combinations thereof. In the methods of the present invention, the natural oil should comprise between about 2–50% by weight of the polyol reactants. In preferred methods, the natural oil should comprise between about 5–30% by weight of the polyol reactants.

The polyols of the present invention have low hydroxyl numbers and low viscosities. Particularly, polyols of the present invention exhibit the following characteristics, regardless of the method used to prepare the polyol:

| | |
|---|---|
| Hydroxyl Number | 90–400 |
| Viscosity | 1000–10000 CPS at 25° C. |

Preferred polyols of the present invention exhibit the following characteristics, regardless of the method used to prepare the polyol:

| | |
|---|---|
| Hydroxyl Number | 100–350 |
| Viscosity | 2000–8000 CPS at 25° C. |

Hydrocarbons and hydrofluorocarbons are soluble in the polyols of the present invention.

The operator may use the polyols of the present invention to make foam, according to the present invention. The operator can make foam using the hand-batch technique. Using the hand-batch technique, the operator first mixes a polyol component with a isocyanate component in a first container. After mixing the polyol component with the isocyanate component, the operator then pours the reaction mixture into a second container. The operator then allows the foam to cure in the second container for at least 24 hours. The polyol component may comprise a polyol of the present invention, other polyols, a catalyst, a surfactant, a blowing agent, a fire retardant, and mixtures thereof. The blowing agent may comprise water, a hydrocarbon, or a hydrofluorocarbon. In preferred embodiments, the isocyanate component comprises Rubinate-M isocyanate.

The following examples illustrate the present invention, and are not intended to limit the scope of the invention in any way.

EXAMPLE 1

Researchers first added 2908 grams of diethylene glycol and 1838 grams of recycled polyethylene terephthalate to a 10 liter glass pot that was equipped with an agitator, reflux condenser, and a thermocouple.

Researchers then heated the reaction mixture to about 450° F., with constant agitation. After heating the reaction mixture for approximately three hours, researchers cooled the reaction mixture to about 300° F. Researchers then filtered the reaction mixture to remove any undigested material.

Researchers then added the filtered reaction mixture, 256.6 grams of pentaerythritol, 1116 grams of crude corn oil, and 2013.6 grams of phthalic anhydride to a 10 liter glass pot. Researchers heated the reaction mixture to about 450° F., under a 200 mm Hg vacuum. At about 420° F., researchers added 8 grams of Tyzor TE (a triethanolamine titanate chelate, sold by DuPont, Wilmington, Del.) to the reaction mixture. Researchers continued the distillation process until the theoretical amount of water was distilled out of the reaction mixture.

Researchers then characterized the resulting polyol by determining hydroxyl number, acid value, and viscosity. The polyol produced according to the above method had the following properties:

| | |
|---|---|
| Hydroxyl number | 250 |
| Acid number | 1.5 |
| Viscosity | 3500 CPS at 25° C. |

EXAMPLE 2

Researchers first added 2908 grams of diethylene glycol, 80 grams of triethylene glycol, 320 grams of tetraethylene glycol, and 2394 grams of recycled polyethylene terephthalate to a 10 liter glass pot that was equipped with an agitator, reflux condenser, and a thermocouple.

Researchers then heated the reaction mixture to about 450° F., with constant agitation. After heating the reaction mixture for approximately three hours, researchers cooled the reaction mixture to about 300° F. Researchers then filtered the reaction mixture to remove any undigested material.

Researchers then added the filtered reaction mixture, 121.6 grams of pentaerythritol, 428 grams of crude corn oil, and 1880.6 grams of phthalic anhydride to a 10 liter glass pot. Researchers heated the reaction mixture to about 450° F., under a 200 mm Hg vacuum. At about 420° F., researchers added 8 grams of Tyzor TE to the reaction mixture. Researchers continued the distillation process until the theoretical amount of water was distilled out of the reaction mixture.

Researchers then characterized the resulting polyol by determining hydroxyl number, acid value, and viscosity. The polyol produced according to the above method had the following properties:

| | |
|---|---|
| Hydroxyl number | 250 |
| Acid number | 2.5 |
| Viscosity | 7712 CPS at 25° C. |

EXAMPLE 3

Researchers first added 3292 grams of diethylene glycol and 1908.8 grams of recycled polyethylene terephthalate to a 10 liter glass pot that was equipped with an agitator, reflux condenser, and a thermocouple.

Researchers then heated the reaction mixture to about 450° F., with constant agitation. After heating the reaction mixture for approximately three hours, researchers cooled the reaction mixture to about 300° F. Researchers then filtered the reaction mixture to remove any undigested material.

Researchers then added the filtered reaction mixture, 250.2 grams of pentaerythritol, 581.6 grams of crude soybean oil, and 2445.6 grams of phthalic anhydride to a 10 liter glass pot. Researchers heated the reaction mixture to about 450° F., under a 200 mm Hg vacuum. At about 420° F., researchers added 8 grams of Tyzor TE to the reaction mixture. Researchers continued the distillation process until the theoretical amount of water was distilled out of the reaction mixture.

Researchers then characterized the resulting polyol by determining hydroxyl number, acid value, and viscosity. The polyol produced according to the above method had the following properties:

| | |
|---|---|
| Hydroxyl number | 250 |
| Acid number | 1.2 |
| Viscosity | 9600 CPS at 25° C. |

EXAMPLE 4

Researchers first added 1470.8 grams of diethylene glycol and 929.6 grams of recycled polyethylene terephthalate to a 10 liter glass pot that was equipped with an agitator, reflux condenser, and a thermocouple.

Researchers then heated the reaction mixture to about 450° F., with constant agitation. After heating the reaction mixture for approximately three hours, researchers cooled the reaction mixture to about 300° F. Researchers then filtered the reaction mixture to remove any undigested material.

Researchers then added the filtered reaction mixture, 130 grams of pentaerythritol, 564.4 grams of sunflower oil, and 1018.4 grams of phthalic anhydride to a 10 liter glass pot. Researchers heated the reaction mixture to about 450° F., under a 200 mm Hg vacuum. At about 420° F., researchers added 4 grams of Tyzor TE to the reaction mixture. Researchers continued the distillation process until the theoretical amount of water was distilled out of the reaction mixture.

Researchers then characterized the resulting polyol by determining hydroxyl number and viscosity. The polyol produced according to the above method had the following properties:

| Hydroxyl number | 220 |
|---|---|
| Viscosity | 4000 CPS at 25° C. |

EXAMPLE 5

Researchers first added 1030.8 grams of diethylene glycol, 494.4 grams of triethylene glycol, 226.4 grams of tetraethylene glycol, and 1774 grams of recycled polyethylene terephthalate to a 10 liter glass pot that was equipped with an agitator, reflux condenser, and a thermocouple.

Researchers then heated the reaction mixture to about 450° F., with constant agitation. After heating the reaction mixture for approximately three hours, researchers cooled the reaction mixture to about 300° F. Researchers then filtered the reaction mixture to remove any undigested material.

Researchers transferred the filtered reaction mixture to a 10 liter glass pot, and added 232.8 grams of pentaerythritol and 816 grams of crude corn oil. Researchers heated the reaction mixture to about 450° F., under a 100 mm Hg vacuum. At about 400°F., researchers added about 4 grams of Tyzor TE. Researchers continued the distillation process until the theoretical amount of ethylene glycol was distilled out of the reaction mixture.

Researchers then characterized the resulting polyol by determining hydroxyl number and viscosity. The polyol produced according to the above method had the following properties:

| Hydroxyl number | 220 |
|---|---|
| Viscosity | 3500 CPS at 25° C. |

EXAMPLE 6

Researchers first added 971.2 grams of triethylene glycol, 1274.8 grams of tetraethylene glycol, and 1678 grams of recycled polyethylene terephthalate to a 10 liter glass pot that was equipped with an agitator, reflux condenser, and a thermocouple.

Researchers then heated the reaction mixture to about 450° F., with constant agitation. After heating the reaction mixture for approximately three hours, researchers cooled the reaction mixture to about 300° F. Researchers then filtered the reaction mixture to remove any undigested material.

Researchers transferred the filtered reaction mixture to a 10 liter glass pot, and added 600.4 grams of crude corn oil. Researchers heated the reaction mixture to about 450° F., under a 100 mm Hg vacuum. At about 400° F., researchers added about 4 grams of Tyzor TE. Researchers continued the distillation process until the theoretical amount of ethylene glycol was distilled out of the reaction mixture.

Researchers then characterized the resulting polyol by determining hydroxyl number and viscosity. The polyol produced according to the above method had the following properties:

| Hydroxyl number | 120 |
|---|---|
| Viscosity | 2800 CPS at 25° C. |

EXAMPLE 7

Researchers tested the solubility of several blowing agents in the polyol described in Example 5. For comparison, researchers also tested the solubility of several blowing agents in Terol 237 (made by Oxid, L.P., Houston, Tex.), a conventional polyol (e.g. a polyol made without a natural oil). Researchers obtained the following results:

| Blowing Agent | Polyol of Example 5 (pphp*) | Terol 237 (pphp*) |
|---|---|---|
| n-pentane | 18 | 0 |
| cyclopentane | 25 | 5 |
| isopentane | 20 | 2 |
| R-141B (dichlorofluoroethane) | 60 | 40 |
| R-134A (tetrafluoroethane) | 20 | 0 |
| R-245AFA(pentafluoropropane) | 45 | 35 |

*parts of blowing agent per 100 parts of polyol

EXAMPLE 8

Researchers prepared foam using the polyester polyol described in Example 6. For comparison, researchers also prepared foam using Terol 150 (made by Oxid, L.P., Houston, Tex.), a conventional polyol (e.g. a polyol without a natural oil). Researchers made the foams using the hand-batch technique, wherein the polyol component and isocyanate component comprised the following:

| | Ingredient | Inventive (% by Weight) | Conventional (% by Weight) |
|---|---|---|---|
| Polyol Component: | Polyol from Example 6 | 80 | 0 |
| | Terol 150 | 0 | 80 |
| | Amino polyether polyol | 20 | 20 |
| | Silicon surfactant | 1 | 1 |
| | Cell opener | as needed | as needed |
| | Catalyst blend | as needed | as needed |
| | Fire retardant | 30 | 30 |
| | Water | 6 | 6 |
| Isocyanate Component: | Rubinate-M isocyanate | 162 | 157 |

Using the hand-batch technique, researchers first mixed the polyol component with the isocyanate component in a first container. After mixing the polyol component with the isocyanate component, researchers then poured the reaction mixture into a second container. Researchers then allowed the foam to cure in the second container for at least 24 hours.

After the foam had sufficient time to cure, researchers then determined the physical properties of the resulting foam. The foam prepared according to the above specifications had the following properties:

|  | Foam made with the polyol from Example 6 | Foam made with a conventional polyol (Terol 150) |
|---|---|---|
| Reactivity at 15° C. | | |
| Cream | 3.5 | 3.0 |
| Rise | 19 | 18 |
| Density, lbs/ft$^3$ (ASTM D 1622-83) | 1.86 | 1.83 |
| Percent Closel Cells (ASTM D 2856-87) | 45 | 48 |
| Thermal Conductivity (ASTM C 518-85) | 0.24 | 0.24 |
| Percent Volume Change (ASTM D 2126-87) | | |
| 100° C. | −4.8 | −5.3 |
| −20° C. | −0.7 | −0.2 |
| Fire Test (JISA 1321 Grade 3 | Passed | Failed |

EXAMPLE 9

Researchers prepared foam using the polyester polyol described in Example 5. For comparison, researchers also prepared foam using Terol 237, a conventional polyol (e.g. a polyol without a natural oil). Researchers made the foams using the hand-batch technique, wherein the polyol component and isocyanate component comprised the following:

| | Ingredient | Inventive (% by Weight) | Conventional (% by Weight) |
|---|---|---|---|
| Polyol Component: | Polyol from Example 5 | 100 | 0 |
| | Terol 237 | 0 | 100 |
| | Catalyst | 3.2 | 3.2 |
| | Water | 0.7 | 0.7 |
| | n-pentane | 16.5 | 16.5 |
| Isocyanate Component: | Rubinate-M isocyanate | 205 | 205 |

Using the hand-batch technique, researchers first mixed the polyol component with the isocyanate component in a first container. After mixing the polyol component with the isocyanate component, researchers then poured the reaction mixture into a second container. Researchers then allowed the foam to cure in the second container for at least 24 hours.

After the foam had sufficient time to cure, researchers then determined the physical properties of the resulting foam. The foam prepared according to the above specifications had the following properties:

|  | Foam made with the polyol from Example 5 | Foam made with a conventional polyol (Terol 237) |
|---|---|---|
| Reactivity at 15° C. | | |
| Cream | 15 | 15 |
| Gel | 35 | 35 |
| Tack Free | 60 | 60 |
| Density, lbs/ft$^3$ (ASTM D 1622-83) | 1.94 | 1.95 |
| Thermal Conductivity (ASTM C 518-85) | 0.187 | 0.184 |
| Percent Volume Change (ASTM D 2126-87) | | |
| −5° F. | −0.35 | −1.31 |
| 158° F. | 1.1 | 0.94 |
| Flammability | | |
| Mobil 45% weight loss | 5.6 | 7.2 |
| DIN 4102 B2 | 10 | 12 |

Although illustrative embodiments have been shown and described, a wide range of modification, changes, and substitution is contemplated in the foregoing disclosure. In some instances, some features of the disclosed embodiments may be employed without a corresponding use of the other features. Accordingly, it is appropriate that the appended claims be construed broadly and in a manner consistent with the scope of the invention.

What is claimed is:

1. A method for preparing polyester polyols from polyethylene terephthalate, the method comprising:
   a. dissolving the polyethylene terephthalate in a solution comprising a plurality of glycols; and
   b. reacting a natural oil with the polyethylene terephthalate-glycol mixture formed in step (a) at about 450° F., under vacuum distillation.

2. The method of claim 1, further comprising the step of adding a catalyst.

3. The method of claim 2, wherein the catalyst is a triethanolamine titanate chelate.

4. The method of claim 1, further comprising the step of adding a polyfunctional alcohol.

5. The method of claim 4, wherein the polyfunctional alcohol is pentaerythritol.

6. The method of claim 1, further comprising the step of removing ethylene glycol from the polyethylene terephthalate-glycol-oil mixture by vacuum distillation.

7. The method of claim 1, further comprising, before the reacting step, the step of filtering the polyethylene terephthalate-glycol mixture.

8. The method of claim 1, wherein the plurality of glycols is diethylene glycol.

9. The method of claim 8, wherein the plurality of glycols is selected from diethylene glycol, triethylene glycol, tetraethylene glycol, pentaethylene glycol, and mixtures thereof.

10. The method of claim 1, wherein the natural oil is corn oil.

11. The method of claim 1, wherein the natural oil is sunflower oil.

12. The method of claim 1, wherein the natural oil is about 2–50% by weight of the polyol reactants.

13. The method of claim 1, wherein the natural oil is about 5–30% by weight of the polyol reactants.

14. The method of claim 1, further comprising the step of isolating the natural oil polyester polyol.

15. A method for preparing polyester polyols from polyethylene terephthalate, the method comprising:
   a. dissolving the polyethylene terephthalate in a solution comprising a plurality of glycols; and
   b. reacting a natural oil and phthalic anhydride with the polyethylene terephthalate-glycol mixture formed in step (a) at about 450° F., under vacuum distillation.

16. The method of claim 15, further comprising the step of adding a catalyst.

17. The method of claim 16, wherein the catalyst is a triethanolamine titanate chelate.

18. The method of claim 15, further comprising the step of adding a polyfunctional alcohol.

19. The method of claim 18, wherein the polyfunctional alcohol is pentaerythritol.

20. The method of claim 15, further comprising the step of continually removing water produced by ester formation from the polyethylene terephthalate-glycol-oil mixture by vacuum distillation.

21. The method of claim further comprising 15, before the reacting step, the step of filtering the polyethylene terephthalate-glycol mixture.

22. The method of claim 15, wherein the plurality of glycols is diethylene glycol.

23. The method of claim 15, wherein the plurality of glycols is selected from diethylene glycol, triethylene glycol, tetraethylene glycol, pentaethylene glycol, and mixtures thereof.

24. The method of claim 15, wherein the natural oil is corn oil.

25. The method of claim 15, wherein the natural oil is sunflower oil.

26. The method of claim 15, wherein the natural oil is about 2–50% by weight of the polyol reactants.

27. The method of claim 15, wherein the natural oil is about 5–30% by weight of the polyol reactants.

28. The method of claim 15, further comprising the step of isolating the natural oil polyester polyol.

29. A polyester polyol produced according to the method of any one of claims 1 to 28.

30. The polyester polyol of claim 29, wherein the polyol has a hydroxyl number of 90–400 and a viscosity of 1000–10000 CPS at 25° C.

* * * * *